(12) United States Patent
Shenoy et al.

(10) Patent No.: US 12,026,311 B2
(45) Date of Patent: Jul. 2, 2024

(54) SYSTEMS AND METHODS FOR DECODING INTENDED SYMBOLS FROM NEURAL ACTIVITY

(71) Applicant: The Board of Trustees of the Leland Stanford Junior University, Stanford, CA (US)

(72) Inventors: Krishna Vaughn Shenoy, Palo Alto, CA (US); Jaimie M. Henderson, Redwood City, CA (US); Francis Robert Willett, Palo Alto, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 18/306,065

(22) Filed: Apr. 24, 2023

(65) Prior Publication Data

US 2023/0409116 A1   Dec. 21, 2023

Related U.S. Application Data

(63) Continuation of application No. 17/006,645, filed on Aug. 28, 2020, now Pat. No. 11,640,204.

(Continued)

(51) Int. Cl.
*G06F 3/01* (2006.01)
*G06F 18/214* (2023.01)
(Continued)

(52) U.S. Cl.
CPC .......... *G06F 3/015* (2013.01); *G06F 18/2148* (2023.01); *G06F 18/41* (2023.01);
(Continued)

(58) Field of Classification Search
CPC .. G06F 3/015; G06K 9/00496; G06K 9/6254; G06K 9/6257; G06N 7/005; G06N 3/08
See application file for complete search history.

(56) References Cited

U.S. PATENT DOCUMENTS

| 8,335,993 B1 | 12/2012 | Tan |
| D684,154 S | 6/2013 | Schontag |

(Continued)

FOREIGN PATENT DOCUMENTS

| EP | 4157434 A1 | 4/2023 |
| KR | 20130002590 A | 1/2013 |

(Continued)

OTHER PUBLICATIONS

International Preliminary Report on Patentability for International Application PCT/US2021/040192, Report dated Dec. 13, 2022, dated Jan. 12, 2023, 11 Pgs.

(Continued)

*Primary Examiner* — Kenneth B Lee, Jr.
(74) *Attorney, Agent, or Firm* — KPPB LLP

(57) ABSTRACT

Systems and methods for decoding intended symbols from neural activity in accordance with embodiments of the invention are illustrated. One embodiment includes a symbol decoding system for brain-computer interfacing, including a neural signal recorder implanted into a brain of a user, and a symbol decoder, the symbol decoder including a processor, and a memory, where the memory includes a symbol decoding application capable of directing the processor to obtain neural signal data from the neural signal recorder, estimate a symbol from the neural signal data using a symbol model, and perform a command associated with the symbol.

18 Claims, 6 Drawing Sheets

Related U.S. Application Data

(60) Provisional application No. 63/047,196, filed on Jul. 1, 2020, provisional application No. 62/893,105, filed on Aug. 28, 2019.

(51) Int. Cl.
  *G06F 18/40* (2023.01)
  *G06N 7/01* (2023.01)
  *G06N 3/08* (2023.01)

(52) U.S. Cl.
  CPC ........... *G06N 7/01* (2023.01); *G06F 2218/00* (2023.01); *G06N 3/08* (2013.01)

(56) References Cited

U.S. PATENT DOCUMENTS

| | | | |
|---|---|---|---|
| 8,949,743 | B2 | 2/2015 | Kida et al. |
| 9,373,088 | B2 | 6/2016 | Nuyujukian et al. |
| 10,223,634 | B2 | 3/2019 | Sussillo et al. |
| 10,684,686 | B1* | 6/2020 | Milstein ................. G06F 3/147 |
| 10,779,746 | B2 | 9/2020 | Even-Chen et al. |
| 10,949,086 | B2 | 3/2021 | Even-Chen et al. |
| 11,461,618 | B2 | 10/2022 | Sussillo et al. |
| 11,640,204 | B2 | 5/2023 | Shenoy et al. |
| 2003/0056278 | A1 | 3/2003 | Kuo et al. |
| 2003/0105409 | A1 | 6/2003 | Donoghue et al. |
| 2004/0073414 | A1* | 4/2004 | Bienenstock ........... G06F 3/015 703/2 |
| 2004/0267320 | A1 | 12/2004 | Taylor et al. |
| 2005/0017870 | A1 | 1/2005 | Allison et al. |
| 2005/0228515 | A1 | 10/2005 | Musallam et al. |
| 2006/0159195 | A1 | 7/2006 | Ionescu et al. |
| 2006/0167371 | A1 | 7/2006 | Flaherty et al. |
| 2006/0274060 | A1 | 12/2006 | Ni et al. |
| 2009/0167706 | A1 | 7/2009 | Tan et al. |
| 2010/0241993 | A1 | 9/2010 | Chae |
| 2010/0274746 | A1 | 10/2010 | Rickert et al. |
| 2010/0280403 | A1 | 11/2010 | Erdogmus et al. |
| 2011/0092842 | A1 | 4/2011 | Decaria et al. |
| 2011/0224572 | A1 | 9/2011 | Gilja et al. |
| 2011/0295143 | A1 | 12/2011 | Leuthardt et al. |
| 2011/0307079 | A1* | 12/2011 | Oweiss ................ A61B 5/4094 600/545 |
| 2012/0022391 | A1 | 1/2012 | Leuthardt |
| 2012/0030696 | A1 | 2/2012 | Smith |
| 2012/0130266 | A1 | 5/2012 | Mathan et al. |
| 2012/0221075 | A1 | 8/2012 | Bentwich |
| 2012/0242659 | A1 | 9/2012 | Sun |
| 2013/0253299 | A1 | 9/2013 | Weber et al. |
| 2013/0311412 | A1 | 11/2013 | Lazar et al. |
| 2013/0314320 | A1 | 11/2013 | Hwang et al. |
| 2014/0132519 | A1 | 5/2014 | Chun |
| 2014/0194720 | A1 | 7/2014 | Hua |
| 2014/0358192 | A1 | 12/2014 | Wheeler Moss et al. |
| 2015/0091791 | A1* | 4/2015 | Segal ................... A61B 5/1128 345/156 |
| 2015/0120777 | A1 | 4/2015 | Ramos |
| 2015/0124063 | A1 | 5/2015 | Woods |
| 2015/0248234 | A1 | 9/2015 | Chen et al. |
| 2015/0268814 | A1 | 9/2015 | Wang |
| 2015/0269336 | A1 | 9/2015 | Duan et al. |
| 2015/0297106 | A1 | 10/2015 | Pasley et al. |
| 2016/0048753 | A1 | 2/2016 | Sussillo et al. |
| 2016/0180215 | A1 | 6/2016 | Vinyals et al. |
| 2016/0224891 | A1 | 8/2016 | Kao et al. |
| 2016/0299568 | A1 | 10/2016 | Segal |
| 2017/0042440 | A1 | 2/2017 | Even-chen et al. |
| 2017/0108926 | A1 | 4/2017 | Moon et al. |
| 2017/0139587 | A1 | 5/2017 | Bostick et al. |
| 2017/0147077 | A1 | 5/2017 | Park et al. |
| 2017/0344220 | A1 | 11/2017 | Cook et al. |
| 2018/0101239 | A1 | 4/2018 | Yin et al. |
| 2018/0177619 | A1* | 6/2018 | Zhang ...................... A61F 2/72 |
| 2019/0021663 | A1 | 1/2019 | Kesinger et al. |
| 2019/0025917 | A1 | 1/2019 | Francis et al. |
| 2019/0053725 | A1 | 2/2019 | Von Novak et al. |
| 2019/0205731 | A1 | 7/2019 | Sussillo et al. |
| 2019/0333505 | A1 | 10/2019 | Stavisky et al. |
| 2020/0057964 | A1* | 2/2020 | Howard ................. G06N 20/10 |
| 2020/0133486 | A1 | 4/2020 | Even-Chen et al. |
| 2020/0142481 | A1 | 5/2020 | Lee et al. |
| 2020/0187841 | A1 | 6/2020 | Ayyad |
| 2021/0064135 | A1 | 3/2021 | Shenoy et al. |

FOREIGN PATENT DOCUMENTS

| | | |
|---|---|---|
| KR | 20150133937 A | 12/2015 |
| WO | 2022006462 A1 | 1/2022 |

OTHER PUBLICATIONS

International Search Report and Written Opinion for International Application No. PCT/US2021/040192, Search completed Nov. 6, 2021, dated Dec. 9, 2021, 21 Pgs.
"Advanced Biosignal Acquisition, Processing and Analysis", g.tec medical engineering GmbH, product catalogue, 2016, 116 pgs.
"Fwillett/cvVectorStats: Overview", Retrieved from: https://github.com/fwillett/cvvectorstats, Mar. 26, 2020, 4 pgs.
"Ganguli-lab/twpca: Time warped principal components analysis (TWPCA)", https://github.com/ganguli-lab/twpca, Apr. 14, 2021, 5 pgs.
"Jpuigcerver/kaldi-decoders: kaldi-decoders", Retrieved from: https://github.com/jpuigcerver/kaldi-decoders, Jun. 10, 2019, 2 pgs.
"Jpuigcerver/Laia:Step-by-step Training Guide Using IAM Database", Retrieved from: https://github.com/jpuigcerver/laia/tree/master/egs/iam, Dec. 10, 2017, 7 pgs.
"Openai/gpt-2:gpt-2", Retrieved from: https://github.com/openai/gpt-2, Dec. 2, 2020, 4 pgs.
"Openai/gpt-2-output-dataset", Retrieved from: https://github.com/openai/gpt-2-output-dataset, Feb. 17, 2021, 3 pgs.
"User-ready brain-computer interface applications", intendiX, g.tec product catalogue, 2016, pp. 96-97.
Abadi et al., "TensorFlow: Large-Scale Machine Learning on Heterogeneous Distributed Systems", Mar. 16, 2016, 19 pgs.
Aflalo et al., "Decoding motor imagery from the posterior parietal cortex of a tetraplegic human", Science, vol. 348, No. 6237, May 22, 2015, pp. 906-910.
Ajiboye et al., "Restoration of reaching and grasping movements through brain-controlled muscle stimulation in a person with tetraplegia: a proof-of-concept demonstration", Lancet, vol. 389, No. 10081, May 6, 2017, Electronic Publication: Mar. 28, 2017, pp. 1821-1830.
Andersen et al., "Selecting the Signals for a Brain-Machine Interface", Current Opinion in Neurobiology, vol. 14, No. 6, Dec. 2004, pp. 720-726.
Anumanchipalli et al., "Intelligible Speech Synthesis from Neural Decoding of Spoken Sentences", bioRxiv, Nov. 29, 2018, 32 pgs.
Anumanchipalli et al., "Speech synthesis from neural decoding of spoken sentences", Nature, No. 568, pp. 493-498, 2019.
Artusi et al., "Performance of a Simulated Adaptive BCI Based on Experimental Classification of Movement-Related and Error Potentials", IEEE Journal on Emerging and Selected Topics in Circuits and Systems, vol. 1, No. 4, Dec. 2011.
Bacher et al., "Neural Point-and-Click Communication by a Person With Incomplete Locked-In Syndrome", Neurorehabilitation and Neural Repair, vol. 29, No. 5, Nov. 10, 2014, pp. 462-471.
Barrero et al., "Evaluation of Text Entry Methods for Interactive Digital Television Applications with Devices Alternative to Conventional Remote Controls", International Journal of Human-Computer Interaction, vol. 32, No. 10, 2016, pp. 765-776.
Bouchard et al., "Control of Spoken Vowel Acoustics and the Influence of Phoentic Context in Human Speech Sensorimotor Cortex", The Journal of Neuroscience, vol. 34, No. 38, Sep. 17, 2014, pp. 12662-12677.
Bouchard et al., "Functional Organization of Human Sensorimotor Cortex for Speech Articulation", HHS Public Access—Author Manuscript, 21 pgs., published in final form as Nature, vol. 495, No. 7441, Mar. 21, 2013, pp. 327-332.

(56) References Cited

OTHER PUBLICATIONS

Bouchard et al., "Neural Decoding of Spoken Vowels from Human Sensory-Motor Cortex with High-Density Electrocorticography", 36th Annual International Conference of the IEEE Engineering in Medicine and Biology Society, Aug. 26-30, 2014, Chicago, IL.
Bouton et al., "Restoring cortical control of functional movement in a human with quadriplegia", Nature, vol. 533, No. 7602, May 12, 2016, pp. 247-250.
Branco et al., "Decoding Hand Gestured from Primary Somatosensory Cortex Using High-Density ECoG", Neuroimage, Feb. 15, 2017, vol. 147, pp. 130-142.
Brants et al., "Web 1T 5-gram Version 1", Retrieved from: https://catalog.ldc.upenn.edu/LDC2006T13, 2006, 2 pgs.
Breshears et al., "A Probabilistic Map of the Human Ventral Sensorimotor Cortex Using Electrical Stimulation", Journal of Neurosurgey, vol. 123, No. 2, Aug. 2015, E Publication May 15, 2015.
Brumberg et al., "Brain-Computer Interfaces for Speech Communication", Speech Communication, Apr. 1, 2010, vol. 52, Issue 4, pp. 367-369.
Brumberg et al., "Classification of Intended Phoneme Production from Chronic Intracortical Microelectrode Recordings in Speech-Motor Cortex", Frontiers in Neuroscience, vol. 5, May 12, 2011, 2 pgs.
Carmena et al., "Learning to Control a Brain-Machine Interface for Reaching and Grasping by Primates", PLoS Biology, vol. 1, No. 2, Nov. 2003, Electronic Publication: Oct. 13, 2003, pp. 193-208.
Cecotti et al., "One step beyond rows and columns flashes in the P300 speller: a theoretical description", International Journal of Bioelectromagnetism, vol. 13, No. 1, 2010, pp. 39-41.
Chakrabarti et al., "Progress in Speech Decoding from the Electrocorticogram", Biomedical Engineering Letters, vol. 5, No. 1, Mar. 2015, pp. 10-21.
Chan et al., "Decoding Word and Category-Specific Spatiotemporal Representations from MEG and EEG", NIH Public Access—Author Manuscript, 24 pgs., published in final form as Neuroimage, vol. 54, No. 4, Feb. 14, 2011, pp. 3028-3039.
Chan et al., "Speech-Specific Tuning of Neurons in Human Superior Temporal Gyrus", Cerebral Cortex, vol. 24, No. 10, Oct. 2014, pp. 2679-2693.
Chavarriaga et al., "Errare machinale est: the use of error-related potentials in brain-machine interfaces", Frontiers in Neuroscience, vol. 8, Article 208 (2014).
Chen et al., "High-Speed Spelling with a Noninvasive Brain-Computer Interface", Proceedings of the National Acad Sci, 112, 2015, pp. E6058-E6067.
Chestek et al., "Long-term stability of neural prosthetic control signals from silicon cortical arrays in rhesus macaque motor cortex", Journal of neural engineering, 8(4):045005, Jul. 2011.
Chetlur et al., "cuDNN: Efficient Primitives for Deep Learning", Retrieved from: arXiv:1410.0759v3, Dec. 18, 2014, 9 pgs.
Cheung et al., "The Auditory Representation of Speech Sounds in Human Motor Cortex", eLife, 2019, 19 pgs.
Cho et al., "Learning Phrase Representations using RNN Encoder-Decoder for Statistical Machine Translation", Retrieved from: arXiv:1406.1078v3, 15 pgs.
Christie et al., "Comparision of Spike Soring and Thresholding of Woltage Waveforms for Intracortical Brain-Machine Interface Performance", Journal of Neural Engineering, 12, 2014, 016009.
Chun et al., "BCI based Hybrid Interface for 3D Object Control in Virtual Reality", IEEE International Conference on Brain-Computer Interface, Feb. 22-24, 2016, 4pgs.
Churchland et al., "Techniques for Extracting Single-Trial Activity Patterns from Large-Scale Neural Recordings", Current Opinion in Neurobiology, vol. 17, No. 5, Oct. 2007, pp. 609-618.
Churchland et al., "Techniques for extracting single-trial activity patterns from large-scale neural recordings.", Current opinion in neurobiology, 17(5):609-618, Oct. 2007.

Cieri et al., "The Fisher Corpus: a Resource for the Next Generations of Speech-to-Text", Proceedings of the Fourth International Conference on Language Resources and Evaluation, 2004, 3. pgs.
Collinger et al., "7 degree-of-freedom neuroprosthetic control by an individual with tetraplegia", NIH Public Access—Author Manuscript, 17 pgs., published in final form as "High-Performance Neuroprosthetic Control by an Individual with Tetraplegia", The Lancet, vol. 381, No. 9866, Feb. 16, 2013, 17 pgs.
Collinger et al., "Functional priorities, assistive technology, and brain-computer interfaces after spinal cord injury", Journal of Rehabilitation Research and Development, vol. 50, No. 2, 2013, pp. 145-160.
Collobert et al., "Wav2Letter: an End-to-End ConvNet-based Speech Recognition System", arXiv preprint arXiv:1609.03193, Sep. 13, 2016.
Corley et al., "Brain-Computer Interface Virtual Keyboard for Accessibility", University of Alabama: Department of Computer Science, Jun. 2012, 6pgs.
Creutzfeldt et al., "Neuronal Activity in the Human Lateral Temporal Lobe: I. Responses to Speech", Experimental Brain Research, vol. 77, No. 3, 1989, pp. 451-475.
Cunningham et al., "A closed-loop human simulator for investigating the role of feedback control in brain-machine interfaces", Journal of neurophysiology, 105(4):1932-1949, Apr. 2011.
Cunningham et al., "Toward Optimal Target Placement for Neural Prosthetic Devices", Journal of Neurophysiology, vol. 100, No. 6, Dec. 2008, pp. 3445-3457.
Daffau et al., "The Role of Dominant Premotor Cortex in Language: A Study Using Intraoperative Functional Mapping in Awake Patients", Neuroimage, vol. 20, No. 4, Dec. 2003, pp. 1903-1914.
Degenhart et al., "Stabilization of a brain-computer interface via the alignment of low-dimensional spaces of neural activity", Nature Biomedical Engineering, Apr. 20, 2020, 37 pgs.
Downey et al., "Blending of brain-machine interface and vision-guided autonomous robotics improves neuroprosthetic arm performance during grasping", Journal of NeuroEngineering and Rehabilitation, vol. 13, No. 28, Mar. 18, 2016, 12 pgs.
Downey et al., "Intracortical recording stability in human brain-computer interface users", Journal of Neural Engineering, vol. 15, No. 4, Aug. 2018, Epublication Mar. 19, 2018.
Einevoll et al., "Modelling and Analysis of Local Field Potentials for Studying the Function of Cortical Circuits", Nature Review Neuroscience, vol. 14, No. 11, Nov. 2013, pp. 770-785.
Ethier et al., "Restoration of grasp following paralysis through brain-controlled stimulation of muscles", Nature, vol. 485, No. 7398, May 17, 2012, pp. 368-371.
Even-Chen et al., "Augmenting intracortical brain-machine interface with neurally driven error detectors", Journal of Neural Engineering, vol. 14, No. 6, Nov. 10, 2017, 16 pgs.
Even-Chen et al., "Auto-Deleting Brain Machine Interface: Error Detection Using Spiking Neural Activity in the Motor Cortex", 37th Annual International Conference of the IEEE Engineering in Medicine and Biology Society, Aug. 25-29, 2015, Milan, Italy, 5 pgs.
Even-Chen et al., "Feasibility of Automatic Error Detect-and-Undo System in Human Intracortical Brain-Computer Interfaces", IEEE Transactions on Biomedical Engineering, vol. 65, No. 8, Aug. 2018, pp. 1771-1784.
Fan et al., "Intention Estimation in Brain-Machine Interfaces", NIH Public Access—Author Manuscript, 28 pgs., published in final form as Journal Neural Engineering, vol. 11, No. 1, Feb. 2014.
Ferrez et al., "EEG-Based Brain-Computer Interaction: Improved Accuracy by Automatic Single-Trial Error Detection", Advances in Neural Information Processing Systems 20, 2007, 8 pgs.
Ferrez et al., "Simultaneous Real-Time Detection of Motor Imagery and Error-Related Potentials for Improved BCI Accuracy", In proceedings of the 4th Inti. Brain-Computer Interface Workshop and Training Course (2008).
Fowler et al., "Improved inference and autotyping in EEG-based BCI typing systems", Proceedings of the ACM SIGACCESS Conference on Computers and Accessibility, Oct. 21-23, 2013, 8pgs.
Ganguly et al., "Emergence of a Stable Cortical Map for Neuroprosthetic Control", PLoS Biology, vol. 7, No. 7, Jul. 21, 2009, e1000153, 13 pgs.

(56) References Cited

OTHER PUBLICATIONS

Gao et al., "A theory of multineuronal dimensionality, dynamics and measurement", bioRxiv, https://doi.org/10.1101/214262, 2017.
Gilja et al., "A High-Performance Neural Prosthesis Enabled by Control Algorithm Design", Nature Neuroscience, vol. 15, No. 12, Dec. 2012, Published Online: Nov. 18, 2012, pp. 1752-1757.
Golub et al., "Internal Models Engaged by Brain-Computer Interface Control", NIH Public Access—Author Manuscript, 11 pgs., published in final form as 34th Annual International Conference of the IEEE EMBS, vol. 2012, 2012, pp. 1327-1330.
Graves et al., "Connectionist Temporal Classification: Labelling Unsegmented Sequence Data with Recurrent Neural Networks", in Proceedings of the 23rd international conference on Machine learning, 2006, pp. 369-376.
Graves et al., "Speech recognition with deep recurrent neural networks", 2013 IEEE International Conference on Acoustics, Speech and Signal Processing, Mar. 22, 2013, pp. 6645-6649, DOI:10.1109/ICASSP.2013.6638947.
Guenther et al., "A Wireless Brain-Machine Interface for Real-Time Speech Synthesis", PLoS One, vol. 4, No. 12, Dec. 9, 2009, 11 pgs.
He et al., "Streaming End-To-End Speech Recognition For Mobile Device", Retrieved from: arXiv:1811.06621v1, Nov. 15, 2018, 5 pgs.
Herff et al., "Automatic Speech Recognition from Neural Signals: A Focused Review", Front Neuroscience, vol. 10, No. 429, Sep. 2016, pp. 1-7.
Herff et al., "Brain-to-text: decoding spoken phrases from phone representations in the brain", Frontiers in Neuroscience, Jun. 12, 2015 vol. 9, No. 217, 11 pgs.
Hill et al., "Recording Human Electrocorticographic (ECoG) Signals for Neuroscientific Research and Real-time Functional Cortical Mapping", Journal of Visualized Experiments, 2012, vol. 64.
Hinton et al., "Deep Neural Networks for Acoustic Modeling in Speech Recognition", IEEE Signal Processing Magazine, vol. 2, Nov. 2012, 16 pgs.
Hochberg et al., "Neuronal ensemble control of prosthetic devices by a human with tetraplegia", Nature, vol. 442, No. 7099, Jul. 13, 2006, pp. 164-171.
Hochberg et al., "Reach and grasp by people with tetraplegia using a neurally controlled robotic arm", Nature, vol. 485, No. 7398, May 17, 2012, pp. 372-375.
Hoggan et al., "Investigating the Effectiveness of Tactile Feedback for Mobile Touchscreens", Proceedings of the SIGCHI Conference on Human Factors in Computing Systems, Florence, Italy, Apr. 5-10, 2008, pp. 1573-1582.
Homer et al., "Sensors and Decoding for Intracortical Brain Computer Interfaces", Annual Review of Biomedical Engineering, vol. 15, Jul. 2013.
Jarosiewicz et al., "Virtual typing by people with tetraplegia using a self-calibrating intracortical brain-computer interface", Science Translational Medicine, 7, 2015.
Jarosiewicz et al., "Virtual typing by people with tetraplegia using a self-calibrating intracortical brain-computer interface", Science Translational Medicine, vol. 7, No. 313, Nov. 11, 2015, 11 pgs.
Jozefowicz et al., "Exploring the Limits of Language Modeling", arXiv:1602.02410v2, Feb. 11, 2016, 11 pgs.
Kao et al., "A High-Performance Neural Prosthesis Incorporating Discrete State Selection With Hidden Markov Models", IEEE Transactions on Biomedical Engineering, vol. 64, No. 4, Apr. 2017, pp. 935-945.
Kao et al., "Information Systems Opportunities in Brain-Machine Interface Decoders", Proceedings of the IEEE, vol. 102, No. 5, May 2014, 17 pgs.
Kao et al., "Single-trial dynamics of motor cortex and their applications to brain-machine interfaces", Nature Communications, vol. 6, No. 7759, Jul. 29, 2015, 12 pgs.
Kellis et al., "Decoding Spoken Words Using Local Field Potentials Recorded from the Cortical Surface", NIH Public Access—Author Manuscript, 20 pgs., published in final form as Journal of Neural Engineering, vol. 7, No. 5, Oct. 2010.
Kim et al., "Neural control of computer cursor velocity by decoding motor cortical spiking activity in humans with tetraplegia", Journal of neural engineering, 5(4):455-476, Dec. 2008.
Kingma et al., "Adam: A Method for Stochastic Optimization", arXiv.org, Retrieved from: https://arxiv.org/abs/1412.6980v1 [cs.LG], Dec. 22, 2014, 9 pgs.
Krusienski et al., "Control of a Visual Keyboard Using an Electrocorticographic Brain-Computer Interface", Neurorehabilitation and Neural Repair, vol. 25, No. 4, May 2011, pp. 323-331, doi:10.1177/1545968310382425.
Lau et al., "A Special Virtual Keyboard for Disabled Computer Users", Proceedings of the International MultiConference of Engineers and Computer Scientists, Mar. 15-17, 2017, 6pgs.
Leuthardt et al., "Using the Electrocorticographic Speech Network to Control a Brain-Computer Interface in Humans", NIH Public Access—Author Manuscript, 22 pgs., published in final form as Journal of Neural Engineering, vol. 8, No. 3, Jun. 2011.
Llera, "Adaptive Classification on Brain-Computer Interfaces Using Reinforcement Signals", Neural Computation, 2012.
Lopez et al., "Text entry with the Apple iPhone and the Nintendo Wii", Proceedings of the Twenty-Seventh Annual SIGCHI Conference on Human Factors in Computing Systems, Boston, USA, Apr. 4-9, 2008.
Lotte et al., "Electrocorticographic Representations of Segmental Features in Continuous Speech", Frontiers in Human Neuroscience, vol. 9, Feb. 24, 2015, 13 pgs.
Maaten et al., "Visualizing Data using t-SNE", Journal of Machine Learning Research, vol. 9, 2008, pp. 2579-2605.
MacKenzie et al., "Text Entry for Mobile Computing: Models and Methods, Theory and Practice", Human-Computer Interaction, vol. 17, No. 2-3: Text Entry for Mobile Computing, Sep. 2002, pp. 147-198.
Makin, "Brain-Computer Interface Allows Speediest Typing to Date", Scientific American, Feb. 21, 2017, 5pgs.
Makin et al., "Machine Translation of Cortical Activity to Text with an Encoder-Decoder Framework", Nature Neuroscience 1-8, 2020, DOI: 10.1038/s41593-020-0608-8.
Malik et al., "Efficient Decoding with Stead-State Kalman Filter in Neural Interface Systems", NIH Public Access—Author Manuscript, 25 pgs., published in final form as IEEE Trans Neural System Rehabilitation Engineering, vol. 19, No. 1, Feb. 2011, pp. 25-34.
Martin et al., "Decoding Spectrotemporal Features of Overt and Covert Speech from the Human Cortex", Front Neuroengineering, vol. 7, May 27, 2014, 15 pgs.
Mayaud et al., "Robust Brain-computer interface for virtual Keyboard (RoBIK): project results", IRBM, Elsevier Masson, vol. 34, No. 2, 2013, pp. 131-138.
McCane et al., "P300-based Brain-Computer Interface (BCI) Event-Related Potentials (ERPs): People with Amyotrophic Lateral Sclerosis (ALS) vs. Age-Matched Controls", Clinical Neurophysiology, vol. 126, No. 11, Nov. 2015, pp. 2124-2131.
Meister et al., "Motor Cortex Hand Area and Speech: Implications for the Development of Language", Neuopsychologia, vol. 41, No. 4, 2003, pp. 401-406.
Mohri et al., "Speech Recognition With Weighted Finite-State Transducers", Springer Handbook on Speech Processing and Speech Communication, 2008.
Moritz et al., "Direct control of paralysed muscles by cortical neurons", Nature, vol. 456, No. 7222, Dec. 4, 2008, pp. 639-642.
Mugler et al., "Direct Classification of all American English Phonemes Using Signals from Functional Speech Motor Cortex", NIH Public Access—Author Manuscript, 16 pgs., published in final form as Journal of Neural Engineering, vol. 11, No. 3, Jun. 2014.
Mulliken et al., "Decoding Trajectories from Posterior Parietal Cortex Ensembles", Journal of Neuroscience, vol. 28, No. 48, Nov. 26, 2008, pp. 12913-12926.
Musallam et al., "Cognitive Control Signals for Neural Prosthetics", Science, vol. 305, No. 5681, Jul. 9, 2004, pp. 258-262.
Nguyen et al., "Inferring Imagined Speech using EEG Signals: A New Approach Using Riemannian Manifold Features", Journal of Neural Engineering, vol. 15, No. 1, 2017.

(56) References Cited

OTHER PUBLICATIONS

Nijboer et al., "A P300-based brain-computer interface for people with amyotrophic lateral sclerosis", Clinical Neurophysiology, vol. 119, No. 8, Aug. 2008, pp. 1909-1916.
Noorzadeh et al., "Beyond 2D for brain-computer interfaces: two 3D extensions of the P300-speller", Proceedings of the IEEE International Conference on Acoustics, Speech, and Signal Processing, May 2014, pp. 5940-5944.
Nuyujukian et al., "A High-Performance Keyboard Neural Prosthesis Enabled by Task Optimization", IEEE Transactions on Biomedical Engineering, vol. 62, No. 1, Jan. 2015, pp. 21-29.
Nuyujukian et al., "A High-Performance Keyboard Neural Prosthesis Enabled by Task Optimization", IEEE Transactions on Biomedical Engineering, vol. 62, No. 1, Sep. 4, 2014.
Nuyujukian et al., "A Nonhuman Primate Brain-Computer Typing Interface", Proceedings of the IEEE, vol. 105, No. 1, Jan. 2017, pp. 66-72.
Nuyujukian et al., "Monkey Models for Brain-Machine Interfaces: The Need for Maintaining Diversity", 33rd Annual International Conference of the IEEE EMBS, Aug. 30-Sep. 3, 2011, Boston, Massachusetts, 5 pgs.
Orhan et al., "RSVP Keyboard: An EEG Based Typing Interface", Proceedings of the IEEE International Conference of Acoustics Speech and Signal Processing, Sep. 12, 2013, 11pgs.
Orsborn et al., "Closed-Loop Decoder Adaptation Shapes Neural Plasticity for Skillful Neuroprosthetic Control", Neuron, vol. 82, No. 6, Jun. 2014, pp. 1380-1393.
Palin et al., "How do People Type on Mobile Devices? Observations from a Study with 37,00 Volunteers", Proceedings of the 21st International Conference on Human-Computer Interaction with Mobile Devices and Services 1-12, Article No. 9, Oct. 2019, https://doi.org/10.1145/3338286.3340120.
Panayotov et al., "Librispeech: An ASR Corpus Based on Public Domain Audio Books", IEEE International Conference on Acoustics, Speech and Signal Processing, Conference Apr. 19-24, 2015, 5 pgs.
Pandarinath et al., "High performance communication by people with paralysis using an intracortical brain-computer interface", Elife, vol. 6, Feb. 21, 2017, 27 pgs.
Paninski et al., "Neural data science: accelerating the experiment-analysis-theory cycle in large-scale neuroscience", Current Opinion in Neurobiology, vol. 50, Jun. 2018, pp. 232-241.
Poole et al., "Time-warped PCA: simultaneous alignment and dimensionality reduction of neural data", Cosyne, 2016.
Povey et al., "The Kaldi Speech Recognition Toolkit", IEEE 2011 Workshop on Automatic Speech Recognition and Understanding, 2011, 4 pgs.
Puigcerver et al., "Are Multidimensional Recurrent Layers Really Necessary for Handwritten Text Recognition?", 2017 14th IAPR International Conference on Document Analysis and Recognition (ICDAR), 2017, pp. 67-72.
Rabbani et al., "The Potential for a Speech Brain-Computer Interface Using Chronic Electrocorticography", Neurotherapeutics, vol. 16, 2019, pp. 144-165.
Rabiner, "A tutorial on hidden markov models and selected applications in speech recognition", In Proceedings of the IEEE, vol. 77, Issue 2, Feb. 1989, pp. 257-286.
Radford et al., "Language Models are Unsupervised Multitask Learners", OpenAI Technical Report, 2018.
Ramsey et al., "Decoding Spoken Phonemes from Sensorimotor Cortex with High-Density ECoG Grids", Neuroimage, Oct. 15, 2018, E Publication Oct. 7, 2017.
Ryu et al., "Human cortical prostheses: lost in translation?", Neurosurgical Focus, 2009.
Sahin et al., "Sequential Processing of Lexical, Grammatical, and Phonological Information within Broca's Area", NIH Public Access—Author Manuscript, 11 pgs., published in final form as Science, vol. 326, No. 5951, Oct. 16, 2009, pp. 445-449.
Santhanam et al., "A high-performance brain-computer interface", Nature, vol. 442, No. 7099, Jul. 13, 2006, pp. 195-198.

Schmidt et al., "Online detection of error-related potentials boosts the performance of mental typewriters", BMC Neurosci. 13:19 (2012).
Serruya et al., "Brain-machine interface: Instant neural control of a movement signal", Nature, vol. 416, No. 6877, Mar. 14, 2002, pp. 141-142.
Shadmehr et al., "Error Correction, Sensory Prediction, and Adaptation in Motor Control", Annu Rev Neuroscience, vol. 33, Jan. 2010, pp. 89-108.
Shenoy et al., "Combining Decoder Design and Neural Adaptation in Brain-Machine Interfaces", Neuron, vol. 84, No. 4, Nov. 19, 2014, 16 pgs.
Shenoy et al., "Cortical Control of Arm Movements: A Dynamical Systems Perspective", Annual Rev Neuroscience, vol. 36, Jul. 8, 2013, E-Publication May 29, 2013.
Simonyan et al., "New Developments in Understanding the Complexity of Human Speech Production", The Journal of Neuroscience, vol. 36, No. 45, Nov. 9, 2016, pp. 11440-11448.
Smith et al., "Optimizing Touchscreen Keyboards for Gesture Typing", Proceedings of the 33rd Annual ACM Conference on Human Factors in Computing Systems, Seoul, Korea, Apr. 18-23, 2015, pp. 3365-3374.
Spuler et al., "Error-related potentials during continuous feedback: using EEG to detect errors of different type and severity", Frontiers in Human Neuroscience, vol. 9, Article 155 (2015).
Stavisky et al., "A High Performing Brain-Machine Interface Driven by Low-Frequency Local Field Potentials Alone and Together with Spikes", HHS Public Access—Author Manuscript, 36 pgs., published in final form as Journal of Neural Engineering, vol. 12, No. 3, Jun. 2015.
Stavisky et al., "Decoding Speech from Intracortical Multielectrode Arrays in Dorsal "Arm/Hand Areas" of Human Motor Cortex", Annual Conference of the IEEE Engineering in Medicine and Biology Society, Jul. 2018, 5 pgs.
Stavisky et al., "Neural ensemble dynamics in dorsal motor cortex during speech in people with paralysis", eLife, vol. 8, Dec. 10, 2019, 72 pgs.
Stolcke et al., "SRILM at Sixteen: Update and Outlook", IEEE Automatic Speech Recognition and Understanding Workshop, Dec. 2011, 5 pgs.
Subasi et al., "EEG signal classification using PCA, ICA, LDA and support vector machines", Expert Systems with Applications, 2010, vol. 37, pp. 8659-8666.
Suppes et al., "Brain Wave Recognition of Words", Proceedings of the National Academy of Sciences, vol. 94, No. 26, Dec. 23, 1997, 5 pgs.
Sussillo et al., "A recurrent neural network for closed-loop intracortical brain-machine interface decoders", Journal of neural engineering 9.2: 026027 Published Mar. 19, 2012.
Sussillo et al., "Making brain-machine interfaces robust to future neural variability", Nature Communications, Published Dec. 13, 2016, 12 pgs.
Sutskever et al., "Generating Text with Recurrent Neural Networks", Proceedings of the 28th International Conference on Machine Learning (ICML-11). 2011.
Tankus et al., "Structured Neuronal Encoding and Decoding of Human Speech Features", HHS Public Access—Author Manuscript, 11 pgs., published in final form as Nature Communications, vol. 3, 2012.
Taylor et al., "Direct Cortical Control of 3D Neuroprosthetic Devices", Science, vol. 296, No. 5574, Jun. 7, 2002, pp. 1829-1832.
Towle et al., "ECoG Gamma Activity During a Language Task: Differentiating Expressive and Receptive Speech Areas", Brain, vol. 131, No. 8, Aug. 2008, pp. 2013-2027.
Townsend et al., "A novel P300-based brain-computer interface stimulus presentation paradigm: moving beyond rows and columns", Clinical Neurophysiology, Vo. 121, 2010, pp. 1109-1120.
Trautmann et al., "Accurate Estimation of Neural Population Dynamics Without Spike Sorting", Neuron, vol. 103, No. 2, Jul. 17, 2019, 42 pgs.
Vainio et al., "Shared Processing of Planning Articulatory Gestures and Grasping", Experimental Brain Research, vol. 232, No. 7, Jul. 2014, pp. 2359-2368.

(56) References Cited

OTHER PUBLICATIONS

Vansteensel et al., "Fully Implanted Brain-Computer Interface in a Locked-In Patient with ALS", The New England Journal of Medicine, vol. 375, No. 21, Nov. 24, 2016, pp. 2060-2066.
Velliste et al., "Cortical control of a prosthetic arm for self-feeding", Nature, vol. 453, No. 7198, Jun. 19, 2008, pp. 1098-1101.
Venkatagiri, "Clinical measurement of rate of reading and discourse in young adults", Journal of Fluency Disorders, vol. 24, No. 3, Sep. 1999, pp. 209-226.
Waldert et al., "Influence of Spiking Activity on Cortical Local Field Potentials", The Journal of Physiology, vol. 21, Nov. 1, 2013, E Publication Aug. 27, 2013, pp. 5291-5303.
Wang et al., "P300 Brain-Computer Interface Design for Communication and Control Applications", Proceedings of the IEEE International Conference of Engineering in Medicine and Biology, Sep. 1-4, 2005, 4pgs.
Willett et al., "Hand Knob Area of Premotor Cortex Represents the Whole Body in a Compositional Way", Cell, 2020, DOI: 10.1016/j.cell.2020.02.043.
Willett et al., "Improving Brain-Machine Interface Performing by Decoding Intended Future Movements", NIH Public Access—Author Manuscript, 27 pgs., published in final form as J. Neural Engineering, vol. 10, No. 2, Apr. 2013, E-Publication Feb. 21, 2013.
Williams et al., "Discovering precise temporal patterns in large-scale neural recordings through robust and interpretable time warping", Neuron, vol. 105, No. 2, Jan. 22, 2020, pp. 246-259.
Wise et al., "Premotor and Parietal Cortex: Corticocortical Connectivity and Combinatorial Computations", Annu Rev Neuroscience, vol. 20, 1997, pp. 25-42.
Wolpaw et al., "Independent home use of a brain-computer interface by people with amyotrophic lateral sclerosis", Neurology, vol. 91, No. 3, Jul. 17, 2018, pp. 258-267.
Xiong et al., "The Microsoft 2017 Conversational Speech Recognition System", Retrieved from: arXiv:1708.06073v2, Aug. 24, 2017, 9 pgs.
Yang et al., "Sensorimotor Experience and Verb-Category Mapping in Human Sensory, Motor and Parietal Neurons", HHS Public Access—Author Manuscript, 29 pgs., published in final form as Cortex, vol. 92, Jul. 2017, pp. 304-319.
Young et al., "The HTK book version 3.4", Microsoft Corporation, Retrieved from: http://www.seas.ucla.edu/spapl/weichu/htkbook/.
Yousry et al., "Localization of the motor hand area to a knob on the precentral gyrus. A new landmark", Brain, 120, 1997, pp. 141-157.
Zeyer et al., "A Comprehensive Study of Deep Bidirectional LSTM RNNS for Acoustic Modeling in Speech Recognition", Retrieved from: arXiv:1606.06871v2, Mar. 29, 2017, 5 pgs.
Zhang et al., "Converting Your Thoughts to Texts: Enabling Brain Typing via Deep Feature Learning of EEG Signals", arXiv: 1709.08820, Sep. 26, 2017, 10 pgs.
Bocquelet, "Toward a Brain-Computer Interface for Speech Restoration", Electronics. Universite Grenoble Alpes, 2017. English. ffNNT: 2017GREAS008ff. fftel-01693270f.
Extended European Search Report for European Application No. 21831539.8, Search completed Apr. 24, 2024, Mailed May 3, 2024, 13 Pgs.
Misawa et al., "A Single-Trial Multiclass Classification of Various Motor Imagery Tasks for EEG-Based Brain-Computer Interface Communication", Electronics and Communications In Japan, Wiley-Blackwell Publishing, Inc, US, Dec. 13, 2016, vol. 100, No. 1, pp. 18-26, XP072447393, ISSN: 1942-9533, DOI: 10.1002/ECJ.11916.
Speier et al., "Integrating Language Models Into Classifiers for BCI Communication: A Review", Journal Of Neural Engineering, Institute Of Physics Publishing, Bristol, GB, May 6, 2016, vol. 13, No. 3, p. 31002, XP020304661, ISSN: 1741-2552, DOI: 10.1088/1741-2560/13/3/031002 [retrieved on May 6, 2016].
Willett et al., "High-Performance Brain-to-Text Communication via Imagined Handwriting", bioRxiv, Jul. 2, 2020, XP093154080, DOI: 10.1101/2020.07.01.183384, Retrieved from the Internet: URL:https://www.biorxiv.org/content/10.1101/2020.07.01.183384v1.full.pdf [retrieved on Apr. 22, 2024].
Willett et al., "High-Performance Brain-to-Text Communication via Imagined Handwriting - Supplementary Materials", bioRxiv, Jul. 2, 2020, pp. 1-20, XP093154678, DOI: 10.1101/2020.07.01.183384 Retrieved from the Internet: URL:https://www.biorxiv.org/content/biorxiv/early/2020/Jul. 2, 2020.07.0 1.183384/DC2/embed/media-2.pdf.

* cited by examiner

SYSTEMS AND METHODS FOR DECODING INTENDED SYMBOLS FROM NEURAL ACTIVITY

CROSS-REFERENCE TO RELATED APPLICATIONS

The current application is a continuation of U.S. Non-Provisional patent application Ser. No. 17/006,645 entitled "Systems and Methods Decoding Intended Symbols from Neural Activity" filed Aug. 28, 2020, which claims the benefit of and priority under 35 U.S.C. § 119(e) to U.S. Provisional Patent Application No. 62/893,105 entitled "Neural Decoding of Attempted Handwriting" filed Aug. 28, 2019, and U.S. Provisional Patent Application No. 63/047,196 entitled "High-Performance Brain-to-Text Communication via Imagined Handwriting" filed Jul. 1, 2020. The disclosures of U.S. Provisional patent application Ser. Nos. 17/006,645, 62/893,105 and 63/047,196 are hereby incorporated by reference in their entireties for all purposes.

STATEMENT OF FEDERALLY SPONSORED RESEARCH

This invention was made with Government support under contract DC014034 awarded by the National Institutes of Health. The Government has certain rights in the invention.

FIELD OF THE INVENTION

The present invention generally relates to decoding handwriting from neural activity.

BACKGROUND

The human brain is a highly complex organ that generates thought and controls motor function of the body. These two functions are closely linked. Handwriting is generally the process of intending to write a specific glyph and performing the necessary motor actions to in fact write the glyph, e.g. by controlling the arm and hand to grip a pencil and draw the glyph on a piece of paper.

Neural signals in the brain can be recorded using a variety of methods that have different advantages and disadvantages. For example, electroencephalograms (EEGs) are useful for measuring local field potentials which measure average neural activity over a region. Smaller electrode arrays, such as (but not limited to) the Utah array, can be used to record the activity of a specific or small group of specific neurons.

SUMMARY OF THE INVENTION

Systems and methods for decoding intended symbols from neural activity in accordance with embodiments of the invention are illustrated. One embodiment includes a symbol decoding system for brain-computer interfacing, including a neural signal recorder implanted into a brain of a user, and a symbol decoder, the symbol decoder including a processor, and a memory, where the memory includes a symbol decoding application capable of directing the processor to obtain neural signal data from the neural signal recorder, estimate a symbol from the neural signal data using a symbol model, and perform a command associated with the symbol.

In another embodiment, the neural signal recorder is a microelectrode array including a plurality of electrodes.

In a further embodiment, the neural signal data describes spikes of neurons in proximity to respective electrodes in the plurality of electrodes.

In still another embodiment, the system further includes at least one output device.

In a still further embodiment, the output device is selected from the group consisting of vocalizers, displays, prosthetics, and computer systems.

In yet another embodiment, the symbol model is selected from the group consisting of: recurrent neural networks (RNNs), long short-term memory (LSTM) networks, temporal convolutional networks, and hidden Markov models (HMMs).

In a yet further embodiment, the symbol model is a recurrent neural network (RNN), and to estimate the symbol from the neural signal data, the symbol decoding application further directs the processor to temporally bin the neural signal data to create at least one neural population time series, convert the at least one neural population time series into at least one time probability series, and identify a most likely symbol from the at least one time probability series after a time delay triggered by identification of a high probability of a new character in the at least one time probability series.

In another additional embodiment, the memory further includes a symbol database including a plurality of symbols, and a plurality of commands, wherein each symbol in the plurality of symbols is associated with a command.

In a further additional embodiment, the plurality of symbols includes letters of an alphabet, and each letter of the alphabet is associated with a command to print the letter to a text string.

In another embodiment again, the text string is vocalized.

In a further embodiment again, the symbols for each letter in the alphabet are difference maximized.

In still yet another embodiment, a method for decoding symbols from neural activity includes obtaining neural signal data from a neural signal recorder implanted into a brain of a user, estimating a symbol from the neural signal data using a symbol model, and perform a command associated with the symbol using a symbol decoder.

In a still yet further embodiment, the neural signal recorder is a microelectrode array including a plurality of electrodes.

In still another additional embodiment, the neural signal data describes spikes of neurons in proximity to respective electrodes in the plurality of electrodes.

In a still further additional embodiment, the method further includes performing the command using at least one output device.

In still another embodiment again, the output device is selected from the group consisting of: vocalizers, displays, prosthetics, and computer systems.

In a still further embodiment again, the symbol model is selected from the group consisting of: recurrent neural networks (RNNs), long short-term memory (LSTM) networks, temporal convolutional networks, and hidden Markov models (HMMs).

In yet another additional embodiment, the symbol model is a recurrent neural network (RNN), and estimating the symbol from the neural signal data includes temporally binning the neural signal data to create at least one neural population time series, converting the at least one neural population time series into at least one time probability series, and identifying a most likely symbol from the at least one time probability series after a time delay triggered by identification of a high probability of a new character in the at least one time probability series In a yet further additional embodiment, the symbol and the command are stored in a symbol database including a plurality of symbols, and a plurality of commands, wherein each symbol in the plurality of symbols is associated with a command.

In yet another embodiment again, the plurality of symbols includes letters of an alphabet, and each letter of the alphabet is associated with a command to print the letter to a text string.

In a yet further embodiment again, the symbols for each letter in the alphabet are difference maximized.

In another additional embodiment again, the text string is vocalized.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
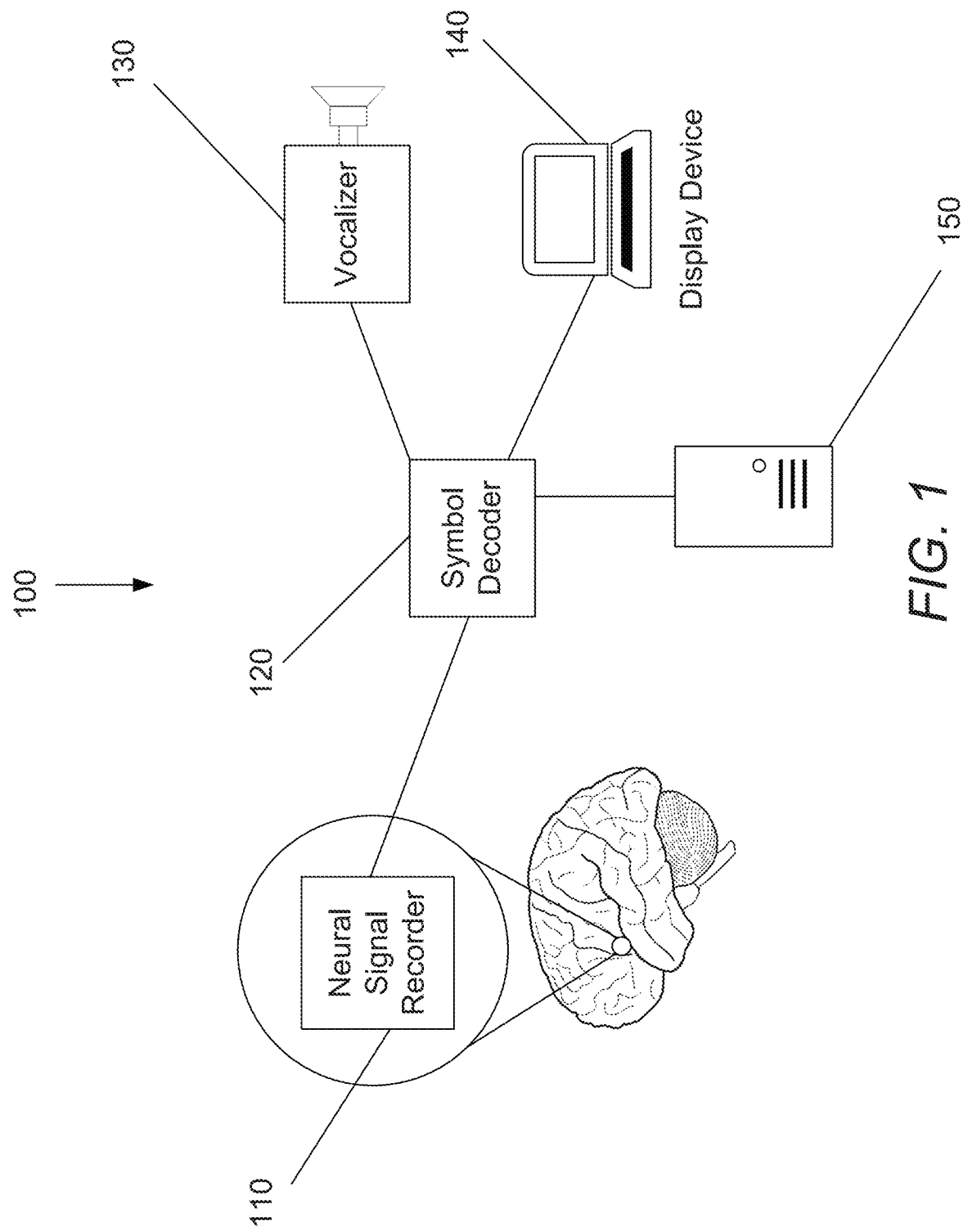
FIG. 1 conceptually illustrates a glyph decoding system in accordance with an embodiment of the invention.

Brain-computer interfaces (BCIs) are devices which turn neural activity in the brain into actionable, machine interpretable data. BCIs have many theoretical applications from control of prosthetic limbs to enabling users to type on a computer using only thought. Systems and methods described herein record neural signals from a user's brain and attempt to decode the signals into one of any number of symbols. In numerous embodiments, the neural signals that are recorded are related to brain activity triggered by the user imagining physically drawing the symbol. In many embodiments, the symbols are alphanumeric characters, and a user imagines handwriting the symbol. However, symbols can be any abstract shape, not restricted to any particular alphabet, as appropriate to the requirements of specific applications of embodiments of the invention. These symbols in turn can be associated with any number of commands. In many embodiments, an alphanumeric character can be associated with a command to print or register that alphanumeric character into a text string. Text strings can be vocalized or otherwise displayed to enable communication. In a variety of embodiments, arbitrary symbols can be assigned to specific functionality, e.g. a "spiral" shape may be used to trigger vocalization of a text string. However this is merely an example command and any arbitrary symbol can be associated with any arbitrary command.

Conventionally, BCI brain-to-text methodologies involve moving a digital cursor over a virtual keyboard where a user can "select" a key to enact that key's function, e.g. selecting a character. However, the act of moving the digital cursor is time consuming and limits the conversational speed of the user. Indeed, data collected suggests that time-varying patterns of movement, such as handwritten letters, can be decoded more easily compared to point-to-point movements. Instead of this more cumbersome interfacing, systems and methods described herein can directly translate imagined handwriting directly into functionality. That is, rather than simply moving a cursor, the user can imagine any arbitrary symbol which has been pre-assigned to a function. This elimination of the need for menus or keyboards rapidly improves the speed at which a user can interact with a computer. In many embodiments, the symbol space (e.g. the set of recognized symbols) is designed to maximize the difference between each symbol so that the time-varying patterns of movement are more easily discernable. Using text input as an example, conventional BCI methods generally achieve at approximately 40 characters per minute, whereas systems and methods described herein have been used to achieve 90 characters per minute at greater than 99% accuracy with general purpose conventional autocorrect.

In order to achieve this functionality, systems and methods described herein associate particular neural signals to particular symbols. Turning now to the drawings, systems and methods for obtaining and decoding said neural signals into symbols in accordance with embodiments of the invention are described. System architectures for symbol decoding systems are described in further detail below.

Symbol Decoding Systems

Symbol decoding systems can obtain neural signals from a brain using neural signal recorders, and decode the signals into symbols using symbol decoders. The decoded symbols in turn can be used to initiate any number of different commands. Turning now to FIG. 1, a system architecture for a symbol decoding system in accordance with an embodiment of the invention is illustrated.

Symbol decoding system 100 includes a neural signal recorder 110. In numerous embodiments, neural signal recorders are implantable microelectrode arrays such as (but not limited to) Utah arrays. The neural signal recorder can include transmission circuitry and/or any other circuitry required to obtain and transmit the neural signals. In many embodiments, the neural signal recorder is implanted into or sufficiently adjacent to the hand knob of the precentral gyrus. However, as one of ordinary skill in the art can appreciate, systems and methods described herein can implant the neural signal recorder into an number of different regions of the brain including (but not limited to) other motor regions, and focus signal acquisition and subsequent processing based on signals generated from that particular region. For example, instead of focusing on handwriting, similar systems and methods could focus on imagined movement of a leg in a particular fashion to produce similar results.

A symbol decoder 120 is in communication with the neural signal recorder. In numerous embodiments, symbol decoders are implemented using computer systems including (but not limited to) personal computers, server systems, cell phones, laptops, tablet computers, and/or any other computing device as appropriate to the requirements of specific applications of embodiments of the invention. The symbol decoder is capable of performing symbol decoding processes for interpreting the acquired neural signals and effecting the appropriate commands.

In many embodiments, the symbol decoder is connected to output devices which can be the subject of any of a number of different commands, including (but not limited to) vocalizer 130, display device 140, and computer system 150. In numerous embodiments, vocalizers can be used to read out text or provide other audio feedback to a user or the user's audience. Similarly, display devices can be used to visualize text or other graphics, and computing systems can generally perform any appropriate command for that computing system. As an example, a computing system may be able to send an email in accordance with commands input by the user. However as can be readily appreciated, any number of different computing systems can be used as an output device depending on the particular needs of the user and available set of commands.

Figure 2:
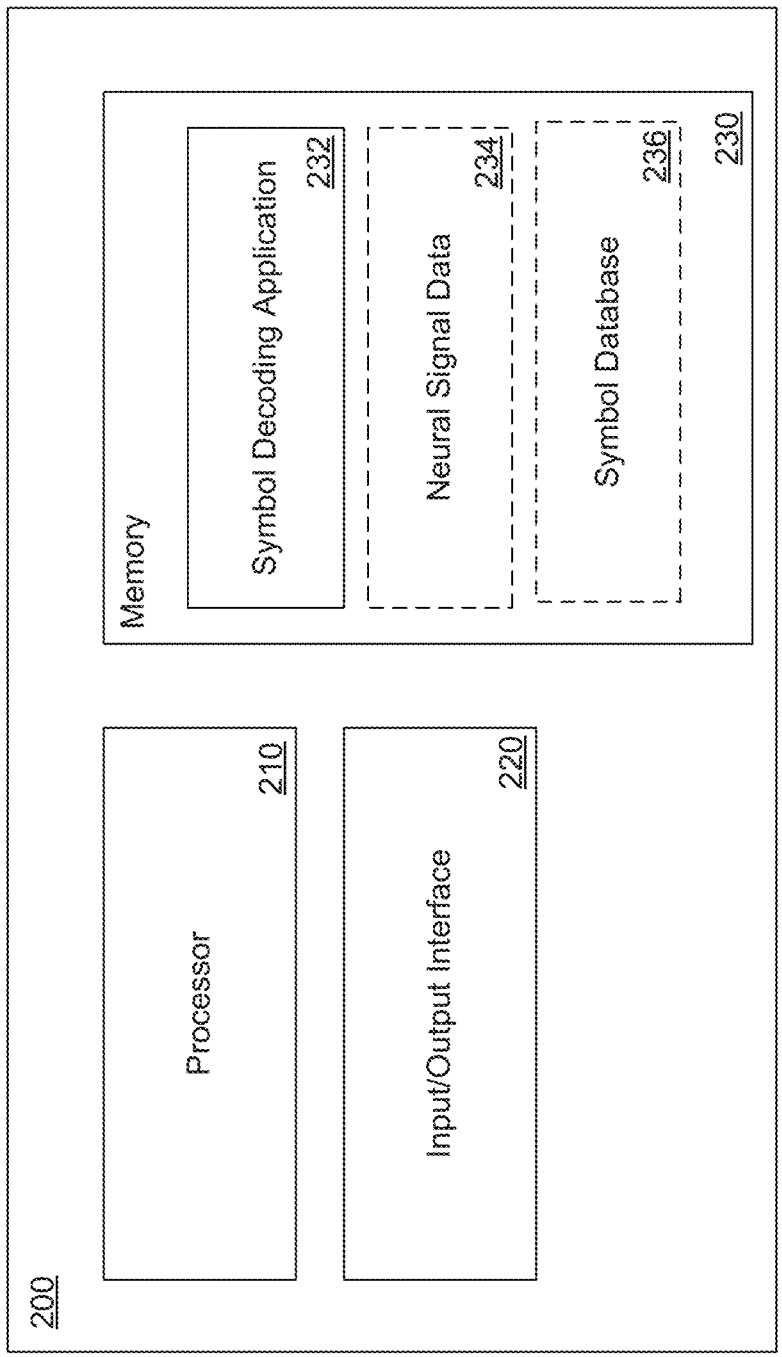
FIG. 2 is a block diagram conceptually illustrating a glyph decoder in accordance with an embodiment of the invention.

Symbol decoders, for example, can be constructed using any of a number of different computing devices. A block diagram for a symbol decoder in accordance with an embodiment of the invention is further illustrated in FIG. 2. Symbol decoder 200 includes a processor 210. Processors can be any number of one or more types of logic processing circuits including (but not limited to) central processing units (CPUs), graphics processing units (GPUs), field-programmable gate arrays (FPGAs), application-specific integrated circuits (ASICs), and/or any other logic circuit capable of carrying out symbol decoding processes as appropriate to the requirements of specific applications of embodiments of the invention.

The symbol decoder 200 further includes an input/output (I/O) interface 220. In numerous embodiments, I/O interfaces are capable of obtaining data from neural signal recorders. In various embodiments, I/O interfaces are capable of communicating with output devices and/or other computing devices. The symbol decoder 200 further includes a memory 230. The memory 230 contains a symbol decoding application 232. The symbol decoding application is capable of directing at least the processor to perform various symbol decoding processes such as (but not limited to) those described herein. In numerous embodiments, the symbol decoding application directs output devices to perform various commands.

In numerous embodiments, at various stages of operation the memory 230 contains neural signal data 324 and/or a symbol database 236. Neural signal data is data describing neuron activity in a user's brain recorded by the neural signal recorder. In many embodiments, the neural signal data reflects action potentials of individual or a small grouping of neurons (often referred to as "spikes") recorded using an electrode of an implanted microelectrode array. In a variety of embodiments, the neural signal data describes various spikes recorded at various different electrodes. Symbol databases can include any number of different symbols and associated commands. In many embodiments, different symbols can be associated with the same command. In various embodiments, the symbols are tailored to an individual user. E.g. a specific user may have a different variant of the letter "A" glyph as compared to a different user. Different symbol databases can be customized with different commands and symbols as desired by a user.

While particular system architectures and symbol decoders are discussed above with respect to FIGS. 1 and 2, any number of different architectures and symbol decoders can be used as appropriate to the requirements of specific applications of embodiments of the invention. For example, in numerous embodiments, a symbol decoding system may only have one output device, or various components may be wirelessly connected. As can be readily appreciated, many different implementations can be utilized without departing from the scope or spirit of the invention. Symbol decoding processes are discussed in further detail below.

Symbol Decoding Processes

Symbol decoding processes can be used to translate brain activity of a user into specific, actionable commands in accordance to the user's intention. In many embodiments, the experience of the user can be akin to imagining drawing a symbol on a piece of paper using a pencil. A symbol decoding process in accordance with an embodiment of the invention can record the neural signals generated by the imagined writing and extract the symbol that was drawn on the imaginary piece of paper. That symbol can then be associated with a particular command such that any time the user imagines drawing that symbol, the command is executed.

Figure 3:
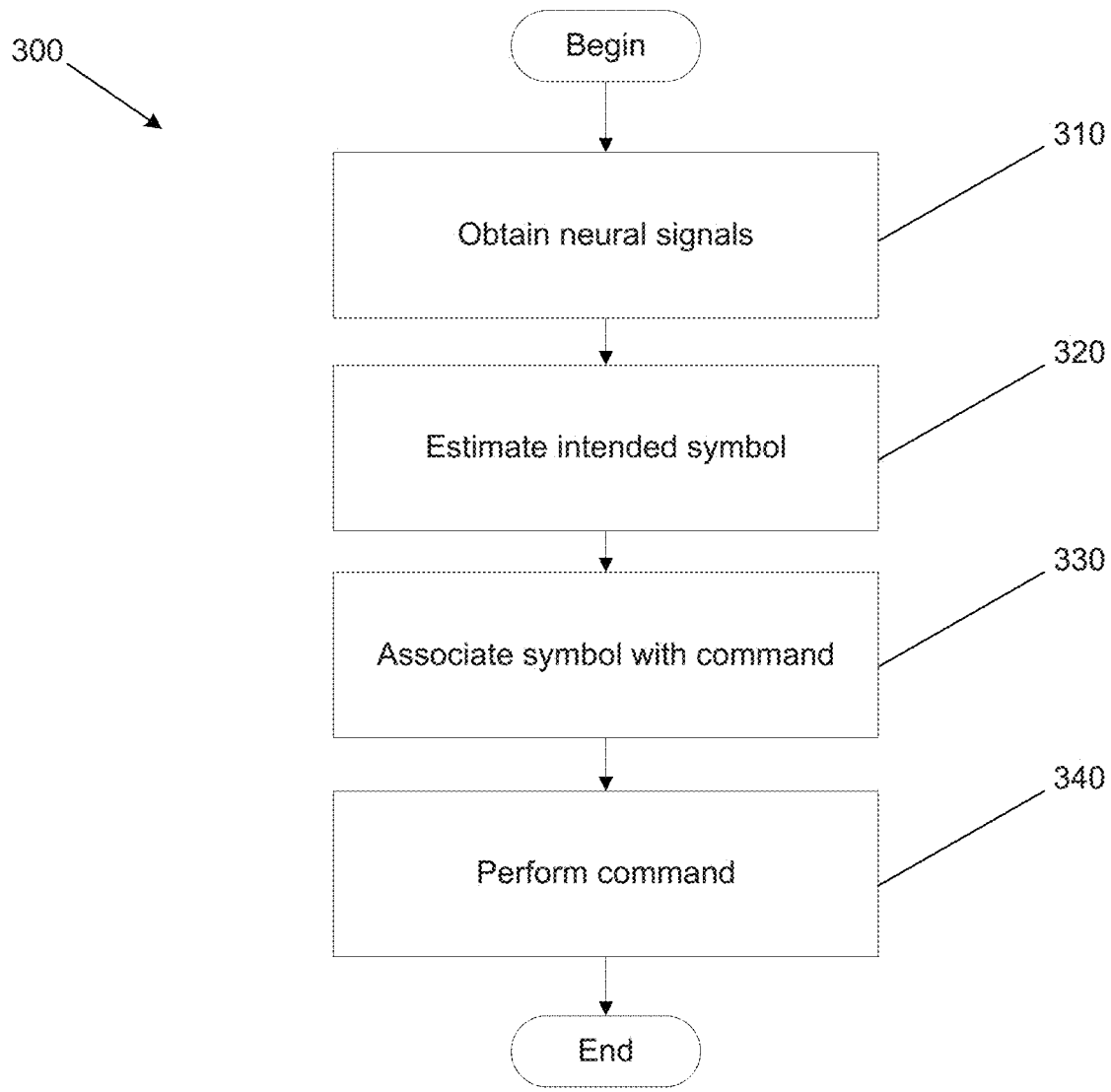
FIG. 3 is a flow chart illustrating a process for performing commands based on glyphs.
Figure 4:
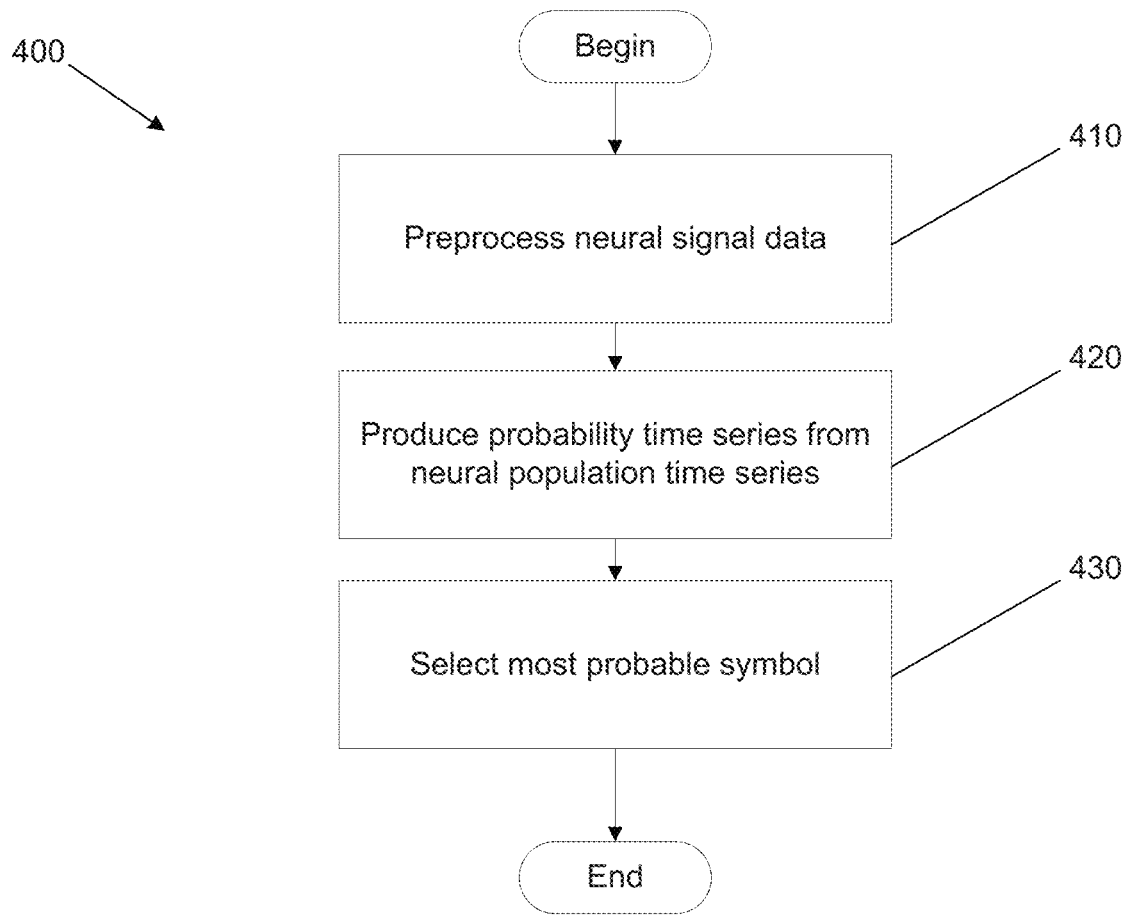
FIG. 4 is a flow chart illustrating a process for decoding neural signals into glyphs in accordance with an embodiment of the invention.

Turning now to FIG. 3, a high level flowchart for a symbol decoding process in accordance with an embodiment of the invention is illustrated. Process 300 includes obtaining (310) neural signals from the user's brain while the user imagines physically drawing a symbol. It is important to note that the user does not need to physically move during the imagination process, and therefore those who cannot physically move a portion of their body can still utilize the systems and methods described herein. In numerous embodiments, the imagination process is specific to the user, and the user is recommended to imagine the same process each time. However, in numerous embodiments, deviation from an established imagined drawing can still yield satisfactory outcomes.

By way of example, in some embodiments, the user attempts and/or images drawing a symbol using a pencil on a piece of paper. However, some users may prefer to write in chalk on a slate. Indeed, any arbitrary scenario can be used so long as the user imagines and/or attempts physically drawing the symbol in a repeatable fashion. Indeed, any attempt at physical movement that traces a trajectory can be used as appropriate to the requirements of specific applications of embodiments of the invention. Further, depending on the location of the neural signal recorder in the brain, the drawing can be performed using the part of the body controlled by the region of the brain the neural signal recorder is in. For ease of description, the remainder of this description discusses in the context of imagined handwriting where the neural signal recorder records the hand knob of the precentral gyrus. As can be readily appreciated, any number of different imaginary writing scenarios can be used based on the location of the neural signal recorder as appropriate to the requirements of specific applications of embodiments of the invention. In many embodiments, the neural signals are recorded using a neural signal recorder as neural signal data.

The neural signal data is used to estimate (320) an intended symbol of the user. In many embodiments, the intended symbol is the one the user imagined drawing. In various embodiments, the estimation is performed by a symbol model. Symbol models can infer underlying sequences of symbols from neural recordings. Symbol models are described in more detail in the following section. The estimated symbol is associated (330) with a command which is performed (340). Processes for making the symbol estimation are discussed in further detail below. Commands can be any arbitrary command carried out by an output device. For example, if the user is attempting to write, the command for each letter symbol can be associated with the command to append the letter to the current text input string. Non-letter symbols (e.g. a question mark) can be associated with appending that non-letter symbol. In some embodiments, arbitrary symbols are associated with appending a specific non-letter or letter symbol, such as (but not limited to) using a square to append a tilde, or a spiral to insert a period.

Commands are not limited to text input. Indeed, any arbitrary computer function, including highly complex, predetermined series of instructions, can be associated with a symbol. For example, a drawn cube may be associated with opening a music streaming program and selecting a particular playlist for immediate playback. As can be readily appreciated, the combinations are endless and the association between symbols and commands can be changed at any time as desired. However, making a correct estimation of the desired symbol is a non-trivial task. Further discussion of how to estimate intended symbols is found below.

Estimating Symbols Using Symbol Models

Figure 5:
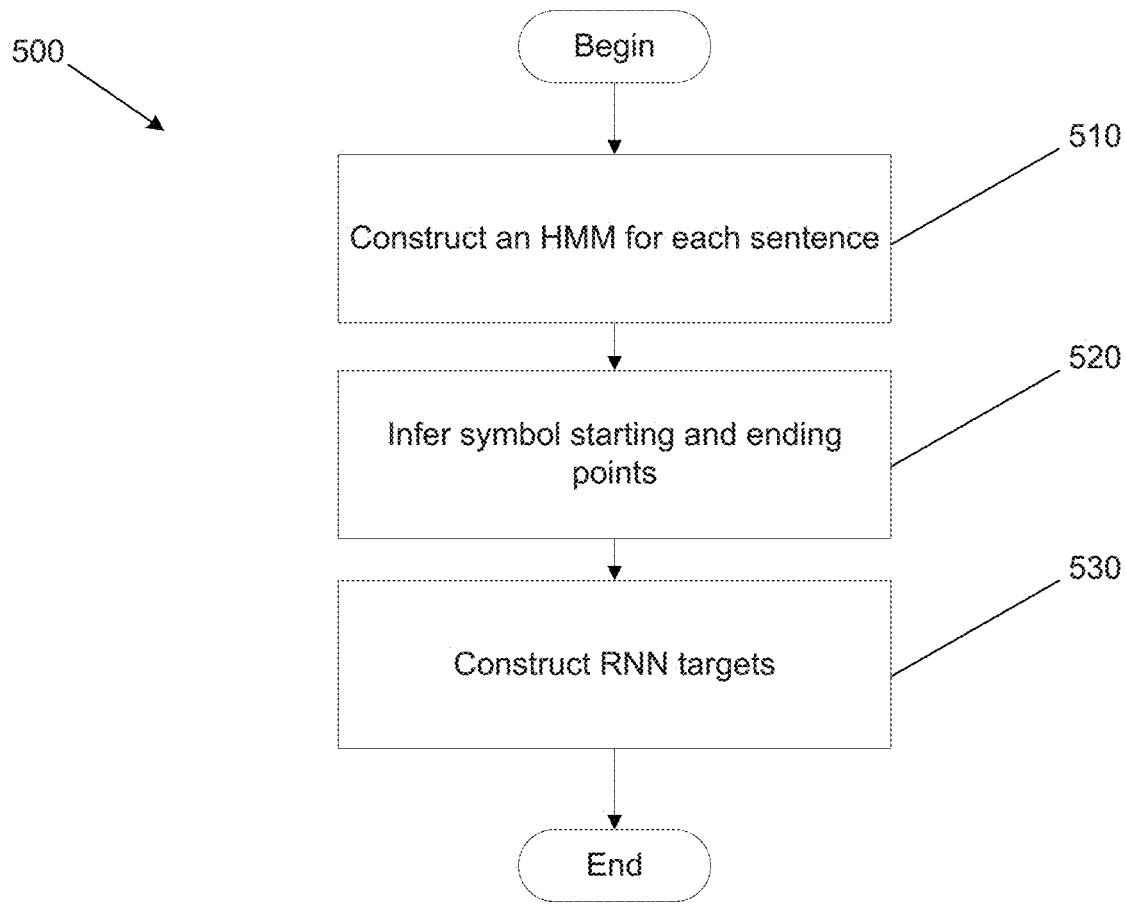
FIG. 5 is a flow chart for a process for generating training data for RNNs in accordance with an embodiment of the invention.

In many embodiments, symbols are estimated using a trained neural network to generate probabilities reflecting the likelihood that a given particular is being "written." In numerous embodiments, the neural network is a recurrent neural network (RNN) which outputs a probability time series describing the likelihood of each character and/or the probability of any new character beginning. However, as noted above, there are many different models that can be used to estimate a symbol from repeatable spike patterns that arise from physical movement that traces a trajectory. For example (long short-term memory) LSTM networks, temporal convolutional networks can be used as well as non-network-based models such as (but not limited to) hidden Markov models (HMMs), which can also infer underlying sequences of symbols from neural recordings. In a variety of embodiments, the neural signal data is preprocessed before being provided to the neural network. A flowchart for a process for estimating intended symbols from neural signal data in accordance with an embodiment of the invention is illustrated in FIG. 5

Process 400 includes preprocessing (410) the neural signal data. In many embodiments, the neural signal data is preprocessed by temporally binning and/or temporally smoothing detected spikes on each electrode in the microelectrode array. In many embodiments, the neural signals are analog filtered and digitized. In some embodiments, the analog filter is from 0.3 Hz to 7.5 kHz, and the filtered signals are digitized at 30 kHz at 250 nV resolution. A common average reference filter can be applied to the digitized signals to subtract the average signal across the microelectrode array from every electrode in order to reduce common mode noise. A digital bandpass filter from approximately 250 Hz to 3000 Hz can then be applied. Threshold crossings for each electrode can be performed and the threshold crossing times binned In many embodiments, the threshold crossing is placed at −3.5×RMS for each electrode, where RMS is the electrode-specific root mean square of the voltage time series recorded for that electrode. In numerous embodiments the temporal binning window is between 10 ms and 300 ms. However, different binning windows can be used based on the user's individual brain. Of note is that each brain is highly idiosyncratic, and many parameters described above and elsewhere can be tuned to produce better results for an individual user. Each bin constitutes a neural population time series referred to as $x_t$.

The neural population time series are provided to an RNN to produce a probability time series. In many embodiments, the RNN is trained to produce a set of probabilities reflective of which symbols are most likely to be associated with the particular population time series. In various embodiments, the RNN is given an output delay value d so the RNN has time to observe multiple population time series which may be associated with the "drawing" of the same symbol. For example, a 1 second output delay would enable 10, 100 ms bins to be observed per probability time series. Again, depending on the ability of the user's brain, longer or shorter bins and output delays may be used.

The resulting time probability series ($p_{t-d}$) is thresholded to select (430) the most probable symbol. In numerous embodiments, when the probability for a "new character" crosses a threshold at time t, the most likely character at time t+0.3 is selected. However, depending on the speed of the individual, the positive offset can be adjusted. In some cases, it may take on the order of seconds for a user to imagine handwriting a symbol depending on the symbols available.

In some embodiments, a language model can be used to reduce errors. Any number of different natural language processing techniques can be added on the back end. However, the raw output is often sufficient, and adding error correction for natural language can increase delay times due to processing time. In some embodiments, error correction can be manually activated only when appropriate, for example when writing long documents.

As noted above, every brain is idiosyncratic, and therefore a generic RNN may not work for every individual. However, a pre-trained RNN can be calibrated to a particular individual. Further, conventional RNN architectures have not presently shown the ability to recognize intended symbols in neural signals. In order to address this deficiency, systems and methods described herein can utilize specially architected decoder RNNs. In many embodiments, a gated recurrent RNN is used. In various embodiments, the recurrent RNN is formalized as:

$$r_t = a(W_r X_t + R_r h_{t-1} + b_{Wr} b_{Rr})$$

$$u_t = a(W_u X_t + R_u h_{t-1} + b_{Wu} + b_{Ru})$$

$$c_t = a_h(W_h X_t + r_t * (R_h h_{t-1} + b_{Rh}) + b_{Wh})$$

$$h_t = (1 - u_t) * c_t + u_t * h_{t-1}$$

where, a is the logistic sigmoid function, an is the hyperbolic tangent, $x_t$ is the input vector at time step t, $h_t$ is the hidden state vector, $r_t$ is the reset gate vector, $u_t$ is the update gate vector, $c_t$ is the candidate hidden state vector, W, R and b are parameter matrices and vectors, and * denotes the element-wise multiplication.

In various embodiments, the gated recurrent RNN utilizes two layers, where the hidden state of the first layer is fed as input to the second layer. As noted above, in numerous embodiments the RNN is trained with an output delay. E.g., the RNN can be trained to predict the symbol probabilities from any arbitrary amount of time in the past. The output probabilities can be computed from the hidden state of the second layer using the following:

$$y_t = \text{softmax}(W_y h_t + b_y)$$

$$z_t = a(W_z h_t + b_z)$$

where, a is the logistic sigmoid function, $h_t$ is the hidden state of the second layer, W and b are parameter matrices and vectors, $y_t$ is a vector of character probabilities (one entry for each symbol), and $z_t$ is a scalar probability that represents the probability of any new symbol beginning at that time step. Whenever $z_t$ crosses a predetermined threshold as described above, the most probable symbol in $y_t$ is emitted after the time delay.

Training RNNs as described herein for symbol decoding systems can be challenging because training data can be difficult to obtain. In many embodiments, training data specific to the user needs to be generated to account for their particular brain. However, many users of symbol decoding systems have some inability to interface with machines using traditional methods (e.g. keyboards, mice, etc.). Therefore it can be difficult to label training data as it is hard or impossible to specifically determine what exactly the user is imagining at a given moment. In numerous embodiments, this can be overcome using forced alignment labeling with hidden Markov Models (HMMs), or using an unsupervised inference method with connectionist temporal classification (and/or other similar cost functions).

In forced alignment methods, an HMM can be used to infer which symbol is being "written" at each time step, fusing knowledge of the sequence of symbols that were supposed to be written with the neural signal data recorded. These symbol labels can then be used to construct target probabilities that the RNN is trained to reproduce. A process for a constructing RNN targets as training data in accordance with an embodiment of the invention is illustrated in FIG. 5.

Process 500 includes constructing (510) an HMM for each sentence of symbols (e.g. letters). In many embodiments, neural signal data for a single symbol are averaged to generate "neural templates" for each symbol. The templates can then be used to define the emission probabilities of the sentence HMMs. The sentence HMMs can then be used to infer (520) symbol starting and ending points within the neural signal data. In various embodiments, the Viterbi algorithm is used to find the most probable start time for each character given the neural activity. RNN targets are constructed (530) based on the start times for each character. For example, target time series of symbol probabilities can be constructed for the RNN to reproduce.

The vector of target symbol probabilities (denoted as y t above) can be constructed by setting the probability at each time step to be a one-hot representation of the most recently started symbol. The scalar symbol start probability (denoted as z t above) can be set to be equal to 1 for a 200 ms window after each symbol began, and was otherwise equal to 0. However, the window size can be modified as discussed above, and the 200 ms window is provided as an example. The symbol start probability allows the decoder to distinguish repeated characters from single characters (e.g., "oo" vs. "o").

One advantage of this strategy for representing the RNN output is that uncertainty about whether pauses are occurring between symbols should not degrade performance, since the labeling routine only needs to identify when each symbol begins (not when it ends). Note that this representation causes the RNN to output a "sample-and-hold"-type signal, where it will continue to output the most recently started symbol until the next one begins.

Labeled data can be broken down such that the signal associated with each symbol can be separated out and recombined into artificial symbol strings (e.g. artificial sentences) which can be added to training data to augment it and to prevent overfitting. This process can be repeated multiple times with the user providing more data each time to create a more robust training data set. In many embodiments, noise can be added to these "neural templates" to yield a more robust RNN.

Figure 6:
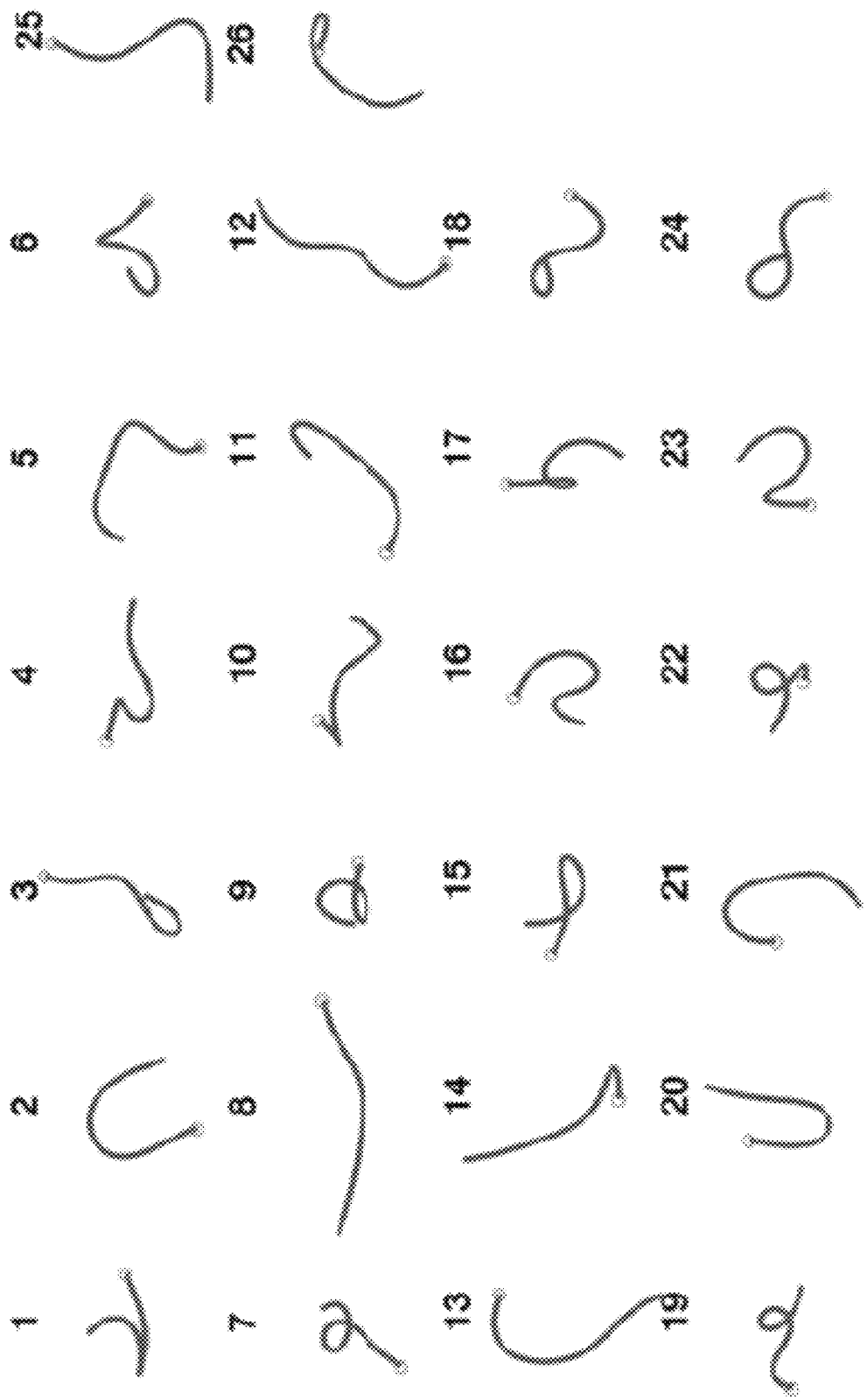
FIG. 6 is an example symbol space in accordance with an embodiment of the invention.

While a particular RNN and training methodology are discussed above, as can be readily appreciated, alternative neural network architectures can be used without departing from the scope or spirit of the invention, for example as noted above, LSTMs, temporal convolutional networks, HMMs, and any other model capable of inferring underlying sequences of symbols from neural recordings. Also, when the computation at hand is not required to be causal, the RNN can be made bidirectional. Further, parameters can be modified based on the needs of the individual user. Additionally, training data for each individual user can be made to the needs of the user by generating training data for symbols the user wants to use. However, as noted above, it can be beneficial to select a symbol space that maximizes the difference between each symbol so that the time-varying patterns of movement are more easily discernable by the RNN. An example symbol space consisting of 26 symbols in accordance with an embodiment of the invention is illustrated in FIG. 6.

Although specific systems and methods for decoding intended symbols from neural activity are discussed above, many different system architectures and decoding methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for decoding symbols from neural activity, comprising:
   a neural signal recorder implanted into a brain of a user; and
   a symbol decoder, the symbol decoder comprising:
   a processor; and
   a memory, where the memory comprises a symbol decoding application capable of directing the processor to:
   obtain neural signal data from the neural signal recorder;
   temporally bin the neural signal data to create at least one neural population time series;
   convert the at least one neural population time series into at least one time probability series; and
   identify a most likely symbol intended by the user from the at least one time probability series after a time delay triggered by identification of a high probability of a new character in the at least one time probability series; and
   perform a command associated with the identified most likely symbol.

2. The system of claim 1, wherein the neural signal recorder is a microelectrode array.

3. The system of claim 1, wherein the symbol model is a neural network.

4. The system of claim 3, wherein the symbol model is selected from the group consisting of: recurrent neural networks (RNNs), long short-term memory (LSTM) networks, and temporal convolutional networks.

5. The system of claim 1, wherein the symbol model is a hidden Markov model.

6. The system of claim 1, wherein each bin is between 10 ms and 300 ms.

7. The system of claim 1, wherein the memory further comprises a symbol database comprising:
   a plurality of symbols; and a plurality of commands;
wherein each symbol in the plurality of symbols is associated with a command.

8. The system of claim 7, wherein the symbols in the symbol database are difference maximized.

9. The system of claim 7, wherein commands in the plurality of commands are computer functions.

10. A method for decoding symbols from neural activity, comprising:
obtaining neural signal data from a neural signal recorder implanted in the head of a user and configured to record neural signals from a brain of the user;
temporally binning the neural signal data to create at least one neural population time series;
converting the at least one neural population time series into at least one time probability series; and
identifying a most likely symbol from the at least one time probability series after a time delay triggered by identification of a high probability of a new character in the at least one time probability series;
and
perform a command associated with the identified most likely symbol using an output device.

11. The method of claim 10, wherein the neural signal recorder is a microelectrode array.

12. The method of claim 10, wherein the symbol model is a neural network.

13. The method of claim 12, wherein the symbol model is selected from the group consisting of: recurrent neural networks (RNNs), long short-term memory (LSTM) networks, and temporal convolutional networks.

14. The method of claim 10, wherein the symbol model is a hidden Markov model.

15. The method of claim 10, wherein each bin is between 10 ms and 300 ms.

16. The method of claim 10, wherein the performed command is associated with the estimated symbol in a database comprising:
a plurality of symbols; and
a plurality of commands;
wherein each symbol in the plurality of symbols is associated with a command.

17. The method of claim 16, wherein the symbols in the symbol database are difference maximized.

18. The method of claim 16, wherein commands in the plurality of commands are computer functions.

* * * * *